United States Patent
Rangaraj

(10) Patent No.: US 10,728,238 B2
(45) Date of Patent: Jul. 28, 2020

(54) SYSTEMS AND METHODS ENCRYPTING MESSAGES USING MULTIPLE CERTIFICATES

(71) Applicant: PAYPAL, INC., San Jose, CA (US)

(72) Inventor: Srinivasan Rangaraj, Cupertino, CA (US)

(73) Assignee: PAYPAL, INC., San Jose, CA (US)

( * ) Notice: Subject to any disclaimer, the term of this patent is extended or adjusted under 35 U.S.C. 154(b) by 122 days.

(21) Appl. No.: 15/840,947

(22) Filed: Dec. 13, 2017

(65) Prior Publication Data

US 2019/0182236 A1    Jun. 13, 2019

(51) Int. Cl.
| | |
|---|---|
| H04L 29/06 | (2006.01) |
| G06F 21/64 | (2013.01) |
| H04L 9/30 | (2006.01) |
| H04L 9/08 | (2006.01) |
| H04L 9/06 | (2006.01) |
| H04L 9/14 | (2006.01) |
| H04L 9/32 | (2006.01) |

(52) U.S. Cl.
CPC .......... *H04L 63/0823* (2013.01); *G06F 21/64* (2013.01); *H04L 9/0643* (2013.01); *H04L 9/0838* (2013.01); *H04L 9/0861* (2013.01); *H04L 9/14* (2013.01); *H04L 9/30* (2013.01); *H04L 9/3239* (2013.01); *H04L 63/0435* (2013.01)

(58) Field of Classification Search
CPC .. G11B 20/00086; G06Q 20/02; G06Q 20/04; G06Q 20/12; G06Q 20/38215; G06Q 20/3823; G06Q 20/3829; G07F 7/1016
See application file for complete search history.

(56) References Cited

U.S. PATENT DOCUMENTS

| | | | |
|---|---|---|---|
| 9,698,976 B1 * | 7/2017 | Statica | .................. H04L 9/0891 |
| 2003/0016819 A1 | 1/2003 | Cheng | |
| 2003/0101359 A1 | 5/2003 | Aschen et al. | |
| 2009/0177894 A1 * | 7/2009 | Orsini | .................. G06F 21/6209 713/193 |

(Continued)

OTHER PUBLICATIONS

International Search Report and Written Opinion—PCT/US18/65457—ISA/US—dated Dec. 13, 2018.

(Continued)

*Primary Examiner* — Abiy Getachew

(74) *Attorney, Agent, or Firm* — Haynes and Boone, LLP

(57) ABSTRACT

This disclosure includes techniques for using multiple cryptographic certificates for a secure connection. One embodiment is a method including: receiving by a client N public encryption keys over a network from a server, wherein N is an integer greater than 1; generating N session keys in response to receiving the N public encryption keys; encrypting each of the N session keys with a respective one of the N public encryption keys; subsequent to encrypting each of the N session keys, sending the N session keys encrypted over the network to the server; encrypting, with a first one of the N session keys, a first portion of a payload associated with a first message; encrypting, with a second one of the N session keys, a second portion of the payload associated with the first message; and sending the first message, comprising the payload encrypted, to the server from the client.

20 Claims, 7 Drawing Sheets

300

304

(56) References Cited

U.S. PATENT DOCUMENTS

| | | |
|---|---|---|
| 2010/0146614 A1 | 6/2010 | Savoor |
| 2011/0224509 A1* | 9/2011 | Fish .................... A61B 5/0002 |
| | | 600/301 |
| 2013/0179981 A1 | 7/2013 | Bekker et al. |
| 2013/0198511 A1 | 8/2013 | Yoo et al. |
| 2015/0312255 A1 | 10/2015 | Libonate et al. |

OTHER PUBLICATIONS

Kaushal Kumar Panday, "SSL Handshake and HTTPS Bindings on IIS", (https://blogs.msdn.microsoft.com/kaushal/2013/08/02/ssl-handshake-and-https-bindings-on-iis/#comments), Aug. 1, 2013, pp. 1-15.

Jaime Hablutzel, "Is it technically possible to configure two different SSL certificates for the same domain?" https://security.stackexchange.com/questions/46988/is-it-technically-possible-to-configure-two-different-SSL-certificates-for-the-same-doman.com.

Mathurvarun, "Bind multiple sites on same IP address and Port in SSL," https://blogs.msdn.microsoft.com/varunm/2013/06/18/bind-multiple-sites-on-same-IP-address-and-Port-in-SSL/, Jun. 18, 2013.

Digicert, "Using Multiple SSL Certificates in Apache with One IP Address," https://www.digicert.com/ssl-support/apache-mulitple-ssl-certificates-using-sni.htm.

\* cited by examiner

402

| Bytes 0, 3, 6 ... | Bytes 1, 4, 7 | Bytes 2, 5, 8 |

404

| Bytes 0-9, 30-39, 60-69 ... | Bytes 10-19, 40-49, 70-79 | Bytes 20-29, 50-59, 80-89 ... |

Fig. 4

SYSTEMS AND METHODS ENCRYPTING MESSAGES USING MULTIPLE CERTIFICATES

BACKGROUND

Field of the Disclosure

The present disclosure generally relates to Access Control and data security, and more particularly to encrypting messages using multiple session keys protected by multiple certificates.

Related Art

With the ever-increasing use of computers, electronic transactions conducted between devices are likewise increasing in number. In some examples, a client device, such as a mobile phone or point-of-sale (POS) system, may have an application that communicates with a remote server. Such communication between the application and the remote server may include sensitive information, such as passwords and other account information. Due to the desire to protect from interception and unauthorized use of the information, some conventional systems may choose to use a secured connection, such as is provided by transport layer security (TLS) techniques. The secured connection uses encryption to prevent a malicious actor from reading any intercepted communications.

Some systems may use a single instance of public/private key encryption to provide a secured connection. For instance, the server may have a certificate from a trusted certificate authority (CA), and the server may provide its certificate (including its public key) to the client to allow the client to validate the identity of the server as well as to allow the client to encrypt subsequent messages. However, there have been recent incidents of a CA being compromised, which calls into question the viability of such secured connections.

Thus, there is a need for systems and methods capable of providing secured connections even in an instance when a CA has been compromised.

BRIEF DESCRIPTION OF THE FIGURES

FIG. 4 is an illustration of example techniques to divide a payload of a message among bits or chunks of bits, according to one embodiment;

Figure 1:
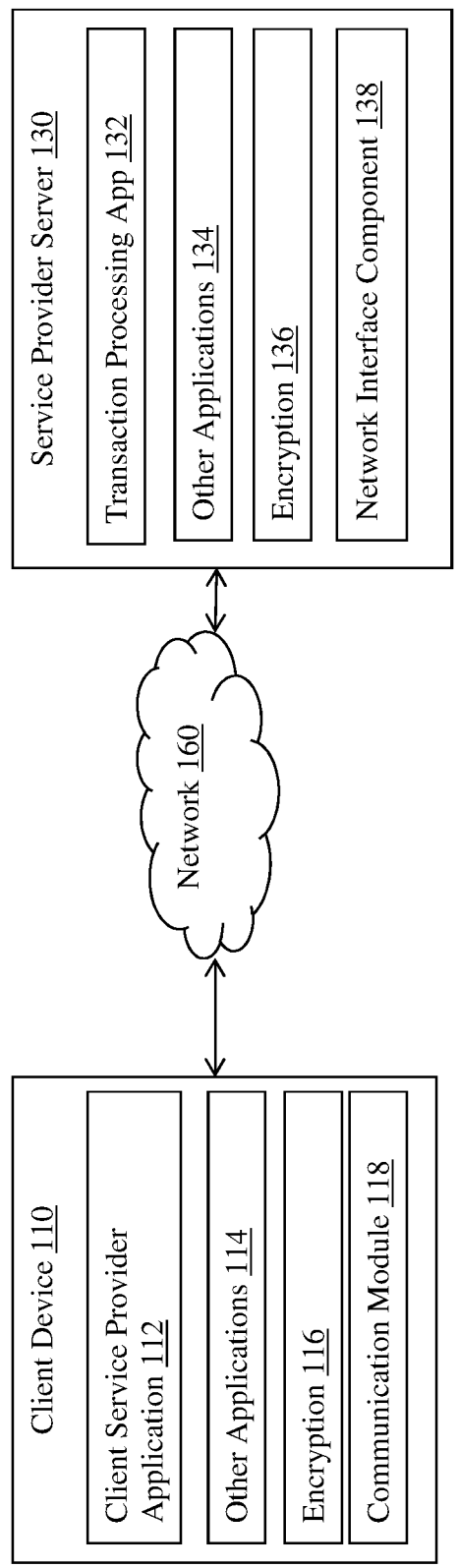
FIG. 1 is an illustration of an electronic processing system, including multiple components communicatively coupled via a network, according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for providing secured connections between servers and clients by using more than one certificate during a setup phase of a communication session, in various embodiments. As noted above, a given Certification Authority (CA) may be compromised from time to time. If a CA has been compromised, and a malicious actor has access to private keys, then a user whose certificate has been compromised may have to wait for the CA to patch its vulnerability and issue new certificates before it can be assured that its connections are secure. However, according to some embodiments, in an instance when one of the certificates has been compromised, security is still provided by virtue of the one or more certificates (issue by more than one CA) that were not compromised.

In one example use case, a user has a mobile device that has a client application running thereon. The client application communicates from time to time over a network with a corresponding server application. The client and server communicate sensitive information, which can be defined as any type of information or data a user may not want an unauthorized user to have, including, but not limited to a birth date, all or parts of a social security number, mailing or billing address associated with an account, account information, such as an account number, passwords, user names, PINs, financial transaction data, mother's maiden name, and answers to security questions for obtaining a password or accessing an account, and thus establish a secured connection at the beginning of a communication session to protect that sensitive information.

Continuing with the example use case, the user may open the client application or power up the mobile device, thereby starting operation of the client application. The client application sends an initial message to the server, and the server acknowledges the message. The client application and the server then exchange information, including the client disclosing its performance characteristics. Examples of the performance characteristics include its operating system, acceptable types of encryption schemes, a number of session keys it may use at a given time, and the like. The server receives the indication of the characteristics from the client device, and in response the server determines an encryption type to use and a number of certificates to use in setting up the communication session with the client application. Examples of encryption types/schemes include Advanced Encryption Standard (AES), Data Encryption Standard (3DES), and the like. The server communicates back to the client application the encryption type to use, the number of certificates (and, thus, the number of session keys) it will use, and instructions as to how to use multiple certificates to encrypt messages.

The server may then send multiple certificates over the network to the client application. In various embodiments, each certificate includes inter alia a public key that is signed by its certificate authority (CA). The client application receives the certificates and verifies them by, e.g., verifying the CA signatures. Further in this example, each of the certificates may be issued by the same CA or by different CAs. In some embodiments, it may be advantageous to use certificates from more than one CA, e.g., if there are two certificates each certificate may be from a different CA, as explained below.

Continuing with the example use case, the server has sent multiple certificates to the client application, and the number of certificates may be determined based at least in part on the client performance characteristics (discussed above). Thus in examples herein, the server sends N certificates to the client application, wherein N is an integer greater than one. In response to receiving the certificates, the client application generates N pseudorandom numbers to be used as symmetric session encryption keys. The symmetric session encryption keys are referred to in this example as symmetric because they can be used to both encrypt a message and decrypt that same message, as opposed to a public/private pair, where only the private key may decrypt a message encrypted with the public key and vice versa. The client application encrypts each individual session key using a respective one of the N public keys and then sends the N encrypted session keys over the network to the server. A malicious actor monitoring these communications would not be able to decrypt the session keys because the session keys can only be decrypted using the private keys corresponding to the N certificates.

In an instance in which one of the certificates may be compromised, the malicious actor might be able to decrypt one of the session keys, but not the other session keys. And while it may be expected that from time to time a CA may be compromised, it is unexpected that multiple CAs would be compromised simultaneously. Thus, using multiple certificates from multiple CAs may provide encryption protection even in the event that one or more of the CAs are compromised.

The N session keys are a shared secret between the client application and the server. For subsequent communications, the server and the client will use the session keys to encrypt and decrypt information. The communications may be secure and private as long as all or some of the session keys are unable to be decrypted by a malicious actor.

Continuing with the example, the client application prepares to send an encrypted message to the server. The client application refers to the instructions sent by the server earlier. Such instructions may specify a division of a message payload into multiple portions. For example, the payload may be divided up into a first half and a second half (when N equals 2), divided into thirds (when N equals 3), or other divisions according to the numerical value of N. The payload may be divided using more complex techniques, such as byte-by-byte into N divisions, every 10 bytes into N divisions, or other appropriate method, wherein each division is individually encrypted using a respective session key.

In an example use case in which N equals 2, the client application encrypts a first portion of the payload using a first one of the session keys and also encrypts a second portion of the payload using a second one of the session keys. With the payload encrypted, the client application sends the message to the server. The server receives the message, decrypts the portions, reassembles the payload as clear text, and uses the information as appropriate. Various embodiments may further use checksums to confirm integrity of the message, as described in more detail below.

Various embodiments may provide advantages over traditional techniques. For instance, some traditional techniques use certificate pinning, wherein a browser may associate certificates with servers, saving the certificates and server identities in memory. Certificate pinning may further include flagging a communication where a known server uses a different certificate in a subsequent communication, thereby potentially indicating a man-in-the-middle attack. However, certificate pinning is traditionally performed at an application layer and may employ relatively large amounts of code and relatively large portions of memory to be performed. By contrast, various embodiments herein may perform encryption using multiple certificates at the transport layer and use less memory and less code, while providing increased security when compared to traditional certificate pinning. Therefore, various embodiments described herein may be particularly applicable to mobile applications on mobile computing devices, where memory may be more limited than other types of computing devices, such as a laptop computer. Nevertheless, the scope of embodiments does not exclude traditional certificate pinning, as it may be used additionally to the techniques described herein in some embodiments.

Additionally, even in a scenario wherein one of the certificates is compromised, the security of the communications should still be ensured so long as at least one other certificate has not been compromised. This may allow a client-server system to continue electronic transactions without sensitive data from being intercepted.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include mobile devices, laptop computers, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a client device 110 and a service provider server 130 in communication over a network 160. A user (not shown) may utilize client device 110 for a variety of different functions, including making or completing purchases via client service provider application 112. Thus, in one example the user of client device 110 is a consumer who makes a purchase at a merchant. In another example, the user of client device 110 is a merchant who completes a transaction. In either case, the client device 110 may communicate with the service provider server 130 over network 160 using a secured connection.

Client device 110 and service provider server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Client device 110 may be implemented as a communication device that may utilize appropriate hardware and software configured for wired and/or wireless communication with merchant device 120 and/or service provider server 130. For example, in one embodiment, client device 110 may be implemented as a personal computer (PC), a smart phone, laptop/tablet computer, wristwatch with appropriate computer hardware resources, eyeglasses with appropriate computer hardware, other type of wearable computing device, implantable communication devices, and/or other types of computing devices capable of transmitting and/or receiving data, such as an IPAD® from APPLE®. Examples of operating systems for use with client device 110 include iOS® OS, Android® OS, and the like. Client device 110 may be managed or controlled by any suitable processing device. Although only one client device 110 is shown, a plurality of like client devices may function similarly.

Client device 110 of FIG. 1 contains a client service provider application 112, other applications 114, an encryption application 116, and a communication module 118. Client service provider application 112, encryption application 116, and other applications 114 may correspond to executable processes, procedures, and/or applications with associated hardware. In other embodiments, client device 110 may include additional or different modules having specialized hardware and/or software as required.

Client service provider application 112 may correspond to one or more processes to execute modules and associated devices of client device 110 to initiate, receive, and/or process/complete transactions using services provided by service provider server 130. In this regard, client service provider application 112 may correspond to specialized hardware and/or software utilized by client device 110 to provide an interface to permit the user associated with client device 110 to make payment or receive payment in coordination with service provider server 130.

In various embodiments, client service provider application 112 may also provide payments and/or transfers to users and/or groups of users, for example, payments to individual sellers or friends for items and/or transfers between known associates. Client service provider application 112 may be implemented as a user interface enabling the user to enter payment options for storage by client device 110 (e.g., using a digital wallet), select and provide payment options on checkout/payment of one or more items with a merchant, and complete a transaction for the item(s) through a purchase request for the item(s). In various embodiments, client service provider application 112 may correspond to a general browser application configured to retrieve, present, and communicate information over the Internet (e.g., utilize resources on the World Wide Web) or a private network. For example, client service provider application 112 may provide a web browser, which may send and receive information over network 160, including retrieving website information, presenting the website information to the user, and/or communicating information to the website, including payment information. However, in other embodiments, client service provider application 112 may include a dedicated application of service provider server 130 or other entity (e.g., a merchant), which may be configured to assist in processing electronic transaction requests. Client service provider application 112 may be utilized to establish and/or maintain a user account and/or digital wallet with service provider server 130.

In one example, the client device 110 and the service provider server 130 use the secured connection over network 160 for login purposes in order to protect password login information. In another example, the client device 110 may be used as a consumer device that logs into service provider server 130 and receives electronic tokens or other sensitive account data over the secured connection. In yet another example, the client device 110 may be used as a merchant device that logs into service provider server 130 and transfers transaction information, including received electronic tokens, to the service provider server 130 and a backend (not shown) in order to receive payment and complete an electronic transaction.

Client service provider application 112 may further store data that is utilized during execution of various modules of client device 110. Thus, client service provider application 112 may store, for example, IDs such as operating system registry entries, cookies associated with client service provider application 112 and/or other applications 114, IDs associated with hardware of client device 110, or other appropriate IDs, such as IDs used for payment/user/device authentication or identification.

In various embodiments, client device 110 includes other applications 114 as may be desired in particular embodiments to provide features to client device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. Other applications 114 may also include other location detection applications, such as a mapping, compass, and/or GPS application, which may be used to determine a physical location for the user.

Other applications 114 may further include social networking applications and/or merchant applications. Other applications 114 may include device interfaces and other display modules that may receive input and/or output information. For example, other applications 114 may contain software programs, executable by a processor, including a graphical user interface (GUI) configured to provide an interface to the user.

Encryption application 116 may be used to encrypt and decrypt data that is transmitted between client device 110 and service provider server 130. Examples of the encryption and decryption functionality provided by encryption application 116 are described in more detail below with respect to FIGS. 2-6. In short, encryption application 116 may be used to exchange certificates, generate pseudorandom alphanumeric strings to be used as session keys, encrypt those session keys for sending to service provider server 130, and encrypt message payloads using those session keys. Encryption application 116 may also decrypt received messages. Encryption application 116 is shown as being separate from application 112 and other applications 114, though the scope of embodiments is not so limited. Rather, encryption application 116 may be its own stand-alone application or may illustrate functionality that may be included within any of the other applications 112, 114.

Client device 110 includes at least one communication module 118 adapted to communicate with merchant device 120 and/or service provider server 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and NFC devices.

Service provider server 130 may be maintained, for example, by an online or mobile electronic transaction service provider, which may provide payment services and/or processing for electronic transactions on behalf of users.

In this regard, service provider server 130 includes one or more processing applications which may be configured to interact with client device 110 and/or another device/server to facilitate payment for a transaction, including establishment of accounts and configuration of mobile device applications to use an acceptance mechanism for electronic payments by a merchant. In one example, service provider server 130 may be provided by PAYPAL®, Inc. of San Jose, Calif., USA. However, in other embodiments, service provider server 130 may be maintained by or include a credit provider, payment services provider, financial data provider, and/or other service provider, which may provide payment services to the user.

Service provider server 130 of FIG. 1 includes a transaction processing application 132, other applications 134, an encryption application 136, and a network interface component 138. Transaction processing application 132 and other applications 134 may correspond to executable processes, procedures, and/or applications with associated hardware. In other embodiments, service provider server 130 may include additional or different modules having specialized hardware and/or software as required.

Transaction processing application 132 may correspond to one or more processes to execute modules and associated specialized hardware of service provider server 130 to receive and/or transmit information from client device 110 for establishing payment accounts, as well as processing and completing of one or more transactions between a customer and a merchant. In this regard, transaction processing application 132 may correspond to specialized hardware and/or software to establish user accounts, which may be utilized to send and receive electronic data needed to facilitate electronic transactions.

A user associated with client device 110 may establish an account with transaction processing application 132 by providing personal and/or financial information to service provider server 130 and selecting an account login, password, and other security information. The account may be used for conducting an electronic transaction, such as to send and receive payments.

As described above, transaction processing application 132 may receive a transaction request from the user of client device 110 (either as a consumer or as a merchant), which may include IDs, tokens, or other data used for transaction processing. The transaction is completed and payment is provided.

Transaction processing application 132 may manage one or more payment accounts with the user of client device 110. Payment accounts in transaction processing application 132 may store entity information, such as name, address, birthdate, payment/funding information, additional user financial information, and/or other desired user data. The entity may link to their respective payment accounts and/or digital wallets through an account, user, merchant, and/or device ID, as well as a generated token, which may be provided to client device 110 via a secured connection over network 160.

In various embodiments, service provider server 130 includes other applications 134 as may be desired in particular embodiments to provide features to service provider server 130. For example, other applications 134 may include security applications for implementing server-side security features, programmatic client applications for interfacing with appropriate application programming interfaces (APIs) over network 160, or other types of applications. Other applications 134 may contain software programs, executable by a processor, including a graphical user interface (GUI), configured to provide an interface to the user when accessing service provider server 130. In various embodiments where not provided by transaction processing application 132, other applications 134 may include connection and/or communication applications, which may be utilized to communicate information to over network 160.

Furthermore, as noted above, encryption application 136 may be used to encrypt and decrypt data that is transmitted between client device 110 and service provider server 130. Examples of the encryption and decryption functionality provided by encryption application 136 are described in more detail below with respect to FIGS. 2-6. For instance, encryption application 136 may be used to exchange certificates, receive performance characteristics from client device 110 and determine an encryption type to use as well as a number N of certificates to use for encryption, and encrypt and decrypt the payload using session keys. Encryption application 136 is shown as being separate from application 132 and other applications 134, though the scope of embodiments is not so limited. Rather, encryption application 136 may be its own stand-alone application or may illustrate functionality that may be included within any of the other applications 132, 134.

In various embodiments, service provider server 130 includes at least one network interface component 138 adapted to communicate client device 110 and/or merchant device 120 over network 160. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

It should be noted that the scope of embodiments is not limited to encryption of payment transactions. Rather, while the example of FIG. 1 is given with respect to payment transactions, the encryption and decryption techniques may be used generally between a server and a client for passing any kind of information between the client device 110 and server 130. In fact, the encryption and decryption techniques provided herein may be provided to a client and server system to advantageously provide security against malicious actors while at the same time conserving processor and memory resources.

Figure 2:
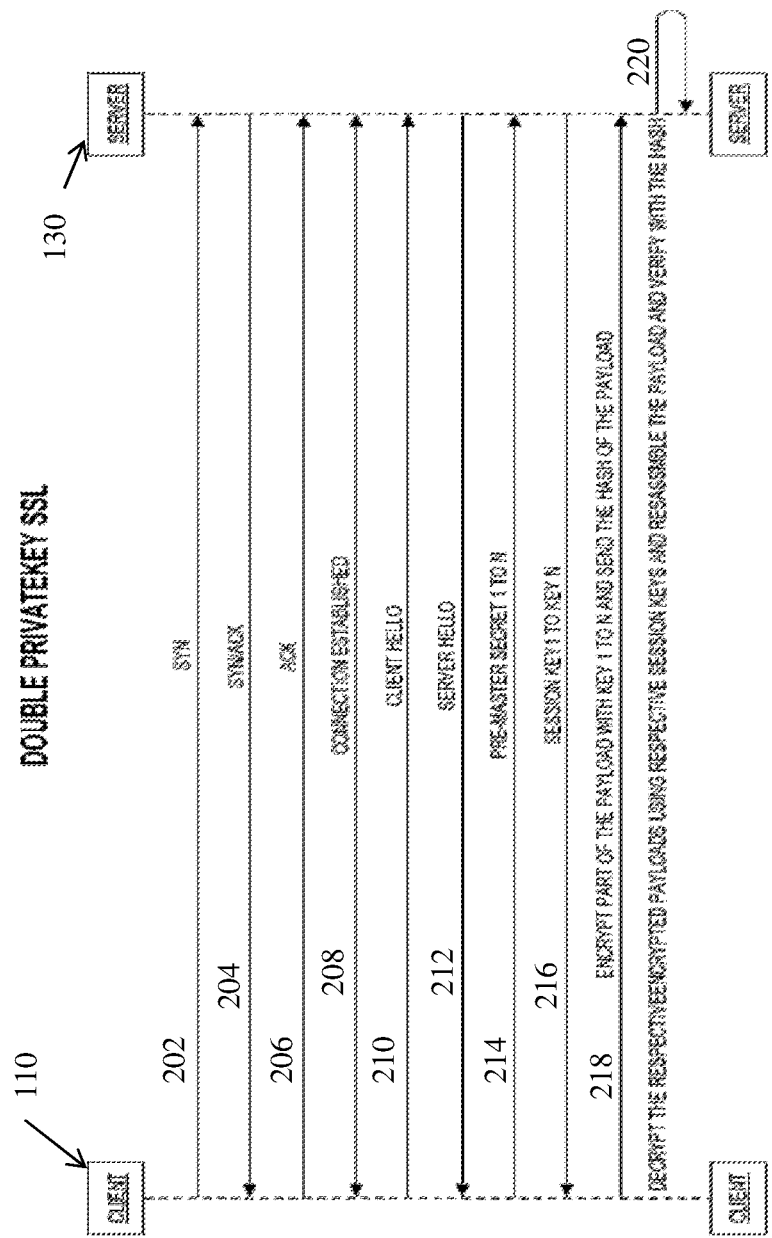
FIG. 2 is a schematic diagram of an example signal diagram showing messages sent between a client and a server, according to one embodiment.

FIG. 2 is a signal diagram, adapted according to one embodiment. The signal diagram of FIG. 2 illustrates a relationship between client device 110 and service provider server 130. Client device 110 and service provider server 130 are described in more detail above with respect to FIG. 1. In this example, client device 110 and a service provider server 130 communicate over network 160 (FIG. 1), and the actions are illustrated with respect to the transport layer. For instance, each of the messages 202-218 may represent one or more data packets that are transported across the network 160.

One example use case begins with a user either powering up client device 110 or starting client service provider application 112 after client device 110 has already been powered up. Client service provider application 112 initiates a connection with server 130 by sending SYN message 202. In response, server 130 sends an acknowledgment (SYN/ACK) message 204. Client service provider application 112 then responds with ACK message 206. Thus, a connection is established between client device 110 and server 130 at message 208. However, in this example at and before message 208, the communications may not yet be encrypted, and no sensitive information may have been exchanged.

Continuing with the example, client hello message 210 includes client service provider application 112 and/or an operating system of client device 110 disclosing client performance characteristics to server 130. For instance, client service provider application 112 may disclose its operating system version, application version, types of encryption (e.g., AES or DES) that it supports, and a number of certificates that it may be able to accommodate for encryption purposes, and the like. Different applications and different client devices may have a wide range of different capabilities. For instance, a small Internet of Things (TOT) device that runs a very small code base and has a less robust processor may have less processing capability than would a laptop computer. Similarly, a merchant-specific or payment service provider-specific application may have less functionality than would a full web browser. Additionally, AES may generally be considered to be less secure than DES, though AES would also generally be expected to be run using fewer processor and memory resources.

Accordingly, devices with fewer resources may appropriately be configured to accommodate a fewer number of session keys or may be configured to accommodate AES encryption but not DES encryption. Similarly, devices with more memory and processing resources may be configured to accommodate a greater number of session keys or may be configured to accommodate either DES or AES, as appropriate.

Using the information from client hello message 210, server 130 determines an encryption type (e.g., AES or DES) and a numerical value for N. Server 130 may also determine a particular division for message payloads. The server 130 then generates a server hello message 212, which specifies encryption type, a numerical value for N, and a particular division for message payloads. Techniques for division of the payload are described in more detail with respect to FIG. 4.

The server hello message 212 also includes N certificates, wherein each of the certificates may include a public key signed by a certificate authority (CA). The certificates are associated with the server and may be used to verify an identity the server. Furthermore, the public keys may be used to encrypt data so that the data may only be decrypted by the corresponding private keys. The private keys are not shared in this example, but rather are stored securely by server 130.

Client device 110 receives server hello message 212, including instructions specifying a numerical value for N, encryption type, and the division for the message payloads and carries out the instructions. For instance, client device 110 generates N pseudorandom alphanumeric strings in response to the server hello message 212. In this example, the pseudorandom alphanumeric strings may be much smaller, e.g., by one or two orders of magnitude, than are the public keys associated with the certificates of the server 130. Thus, the system may receive a benefit of efficiency and lower use of processing power by encrypting messages using the symmetric keys rather than the public keys. Although not mentioned above, client device 110 may also have one or more certificates that it sends to the server 130 at client hello message 210 in order to authenticate itself.

Client device 110 may then encrypt each one of the alphanumeric strings using a respective one of the N public keys. Client device 110 may then transmit the N encrypted alphanumeric strings over the network to the server 130 by message 214. The N encrypted alphanumeric strings at message 214 may be referred to in this example as secrets because they are assumed to be unknown to outside third parties because of their encryption using the public keys of the server 130. The N encrypted alphanumeric strings at message 214 are also referred to as session keys because they are employed as symmetric keys to perform the encryption associated with message 218 (described in more detail below). In response to receiving message 214, server 130 may then acknowledge receipt of the symmetric keys by any appropriate technique, such as sending a brief acknowledgment message 216, encrypted using the symmetric keys.

At this point in the example signal diagram, both the client device 110 and the server 130 are in possession of secret symmetric keys (also called session keys) that have only been transmitted over network 160 using encryption by respective N public keys of the server. Since no third-party should have had access to the N encrypted session keys, the session keys are expected to provide security to the connection when they are used to encrypt messages between the client device 110 and the server 130.

The client device 110 may then send an encrypted message 218 to the server 130. The client device 110 performs the encryption of the payload of the message using the N symmetric keys. For instance, if N equals 2, the client device 110 may encrypt a first portion of the message payload using the first symmetric key and encrypt a second portion of the message payload using the second symmetric key.

Various embodiments may also use a checksum to ensure integrity of the message. For instance, the client device 110 may perform a hash (e.g., and MD5 hash) on the unencrypted payload and then add the hash to the payload and then perform the encryption. Alternatively, the client device 110 may encrypt the payload, perform the hash, and add the hash to either a trailing portion or a leading portion of the payload or add the hash to a header of the message.

In any event, the message 218 may include sensitive information (or not), but it is assumed to be secure because it is encrypted using the N symmetric keys. The server 130 receives the message 218 and decrypts the message at action 220. An example of action 220 includes the server 130 decrypting the first portion of the payload, then decrypting the second portion of the payload, reassembling the payload as clear text, running the same hash on the payload and comparing that hash to the hash that was sent in the message. If the two hashes match, then that indicates integrity of the message. If the two hashes do not match, then server 130 may request that the message be re-sent.

It was noted above that the server 130 sends instructions at server hello message 212, and thus server 130 is aware of the numerical value of N, the encryption type, and the particular division of the payload. Server 130 uses this information to decrypt and reassemble the data in the payload. Server 130 may then process the data as appropriate.

Furthermore, while the example of FIG. 2 shows the client device 110 performing encryption and the server 130 performing decryption, the example embodiment further includes a subsequent message (not shown) sent from server 130 to client device 110, wherein the server 130 encrypts the message the same as message 218 is encrypted and client device 110 then decrypts and reassembles the message. In fact, during operation, various embodiments may include multiple messages sent from client device 110 to server 130 and from server 130 to client device 110, wherein the sending device performs the encryption and the receiving device performs decryption as described above. Furthermore, the scope of embodiments is not limited to any number of messages between the server 130 and the client device 110, as the server 130 and the client device 110 may communicate indefinitely for as long as appropriate.

Figure 3:
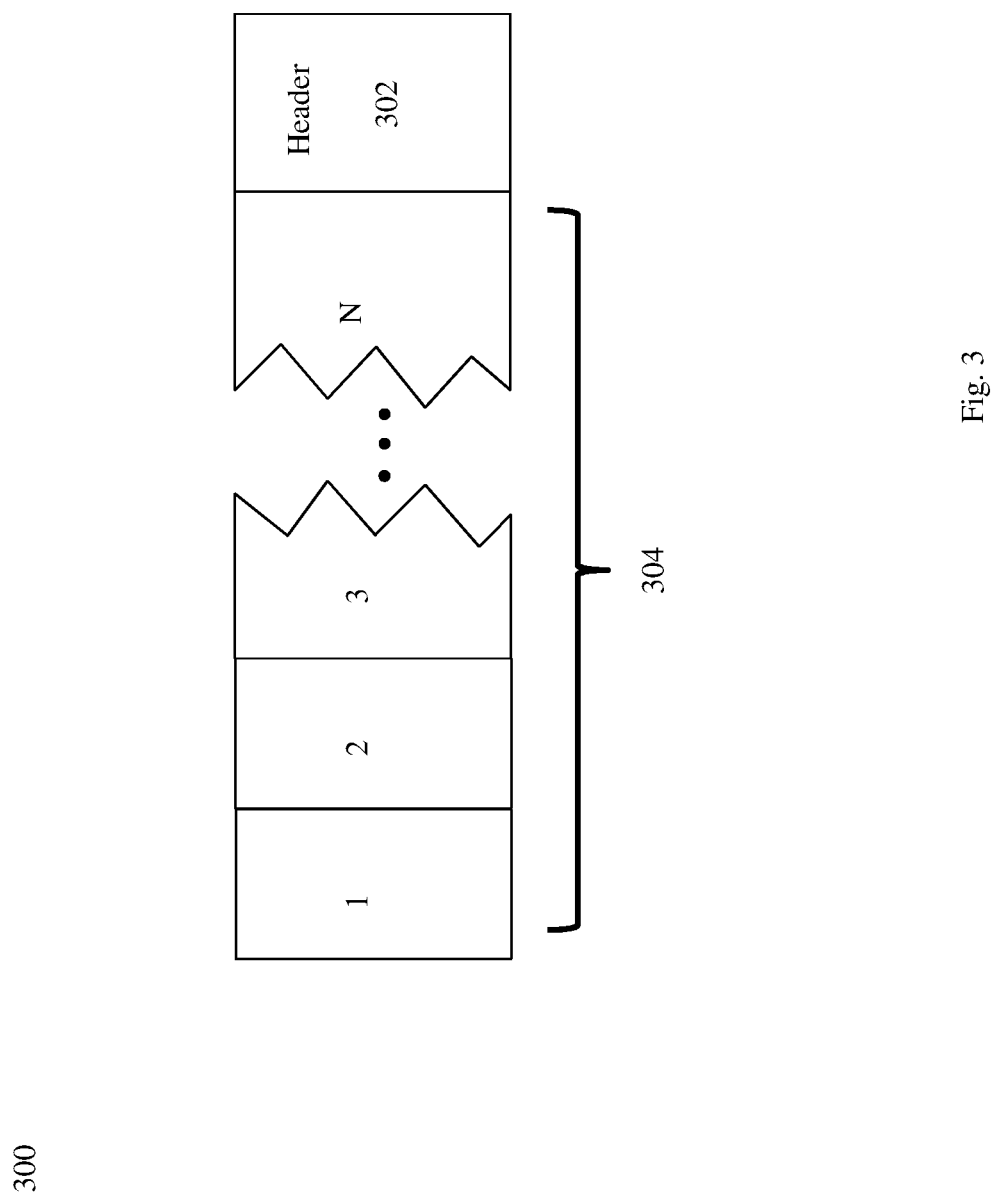
FIG. 3 is an illustration of an example message that may be sent between a client and a server, including an encrypted payload, according to one embodiment.

FIG. 3 is an illustration of an example message, according to one embodiment. As noted above, messages may include one or more packets, and in the example of FIG. 3 is illustrated as a single packet for ease of illustration. Packet 300 includes a header 302 and a payload 304. The payload 304 is divided into N portions, where each of the N portions may be encrypted by a respective one of the N symmetric keys noted above. Header 302 may include information, e.g., an IP addresses for destination and source, allowing packet 300 to be routed appropriately. Payload 304, on the other hand, includes actual data, and in some instances it may be sensitive data. In some examples, payload 304 is encrypted, whereas some or all of header 302 remains unencrypted. Furthermore, while the present example refers to header 302, it is understood that examples using footers rather than headers are within the scope of embodiments as well.

FIG. 4 is an illustration of example payload divisions, according to one embodiment. Different methods of dividing the payload (e.g., payload 304 of FIG. 3) may be used in various embodiments, and different methods may be applicable to different numerical values for N.

In the example of FIG. 4, N equals 3. First, looking at the payload 402, it is divided into three portions, and the bytes of the payload are divided byte-by-byte. For instance, byte 0 is assigned to the first portion, byte 1 is assigned to the second portion, byte 2 is assigned to the third portion, byte 3 is assigned to the first portion, and on and on. Next, looking at payload 404, it is also divided into three portions. However, in the example of payload 404, the bytes are divided into 10 byte chunks. Bytes 0-9 are assigned to the first portion, bytes 10-19 are assigned to the second portion, bytes 20-29 are assigned to the third portion, bytes 30-39 are assigned to the first portion, and on and on. However, the scope of embodiments is not limited to byte-by-byte or 10 byte chunks. Rather, various embodiments may use chunks of any appropriate size.

Additionally, while the example of FIG. 4 shows two different payloads that are divided into three portions (i.e., N equals 3), various embodiments may use any appropriate numerical value for N. And in an example in which N equals a number other than 3, payloads may be divided up byte-by-byte or chunk-by-chunk as appropriate. In various embodiments, the particular division of bytes or chunks into portions may be communicated from the server to the client and then implemented by both the client and server, for example during a handshaking operation including the server hello message 212. Various embodiments may use any appropriate division of the payload, and other embodiments may include the server determining to use different divisions for different communication sessions so as to provide a measure of unpredictability to any potential malicious actors.

Figure 5:
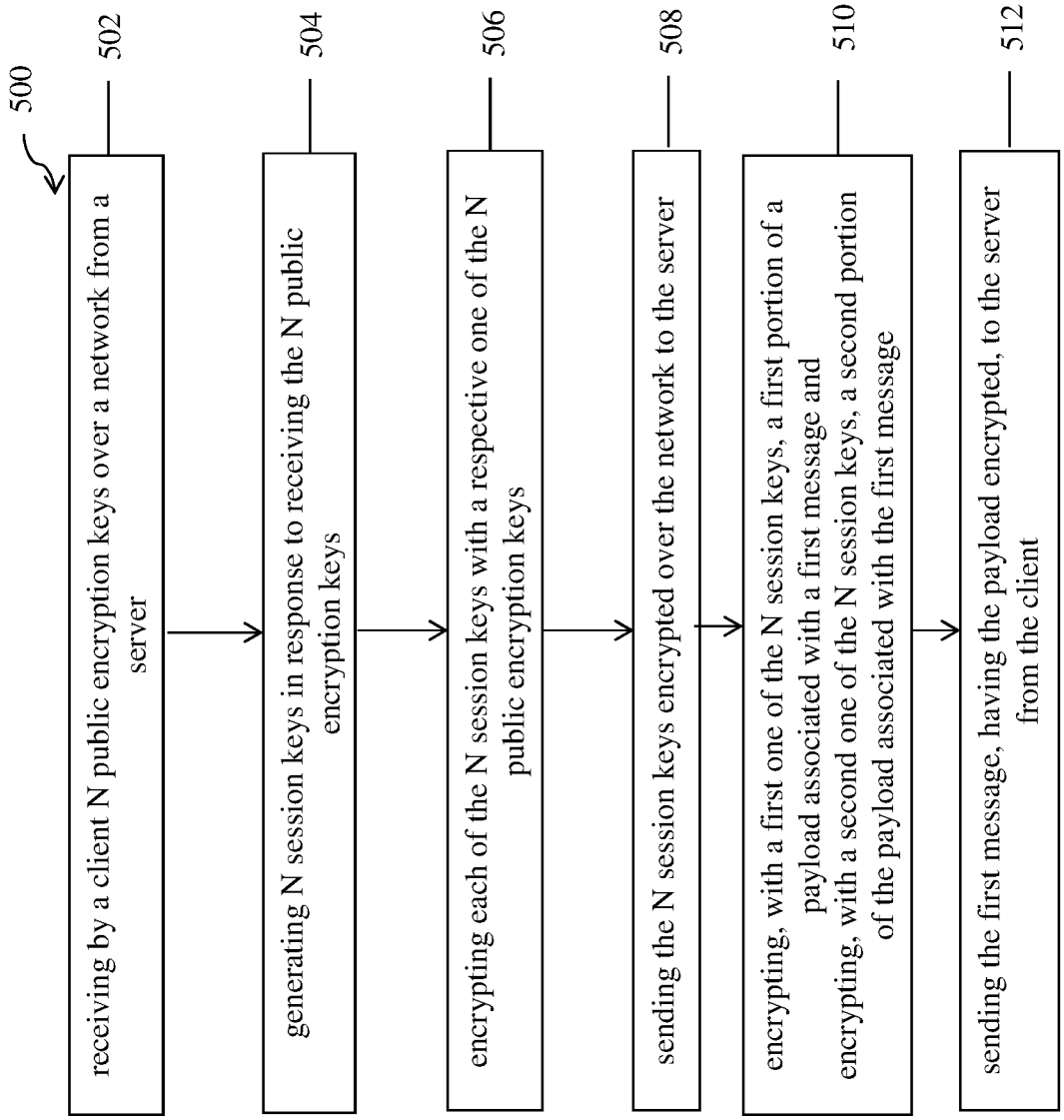
FIGS. 5 and 6 are flowcharts illustrating an embodiment of a method for providing secure communications between a server and a client, according to one embodiment.

FIG. 5 is an illustration of an example method 500, adapted according to one embodiment. The actions of method 500 may be performed by a client device (e.g., client device 110). The various actions are provided by the devices as a result of executing computer-readable code by one or more processors, wherein the computer-readable code includes instructions. For instance, encryption application 116 of FIG. 1 running on a client device may execute instructions to provide the functionality described below.

At action 502, the encryption application receives N public encryption keys over a network from a server. An example is shown at the server hello message 212 of FIG. 2, wherein the server sends a message including among other things N public encryption keys. For instance, the message may include N certificates issued by CAs, as well as instructions for which encryption type to use and how to divide a message payload.

At action 504, the encryption application generates N session keys in response to receiving the N public encryption keys. In some examples, the encryption application may use a pseudorandom number generator to generate N different alphanumeric strings to be used as session keys in subsequent communications with the server. An example is described above with respect to message 214 of FIG. 2.

At action 506, the encryption application encrypts each of the N session keys with a respective one of the N public encryption keys. Or put another way, in this example, the encryption application may encrypt each one of the session keys with a different one of the public encryption keys received at action 502 so that each one of the session keys is associated with a specific, respective public key.

At action 508, the encryption application sends the N session keys encrypted over the network to the server. An example is described above with respect to message 214 of FIG. 2. Thus, each of the session keys is encrypted independently and differently from the other session keys as it is sent over the network. Such independent and different encryption may increase security in the client-server system because a malicious actor who might be able to decrypt one of the session keys would be unlikely to be able to decrypt the other session keys.

At action 510, the encryption application encrypts a first portion of a payload with a first one of the N session keys. The encryption application also encrypts a second portion of the payload with a second one of the N session keys. As noted above, N may be any integer greater than one. So for instance, in an example in which N equals 4, there would be four portions of the payload, and each of the portions would be encrypted using a respective one of the four session keys. Similarly, in an example in which N equals 8, there would be eight portions of the payload, and each of the portions would be encrypted using a respective one of the eight session keys. Techniques for dividing the payload into portions are described above with respect to FIG. 4.

At action 512, the encryption application sends the message, including the payload encrypted, to the server from the client. As noted above, in this example the payload may be divided into multiple portions with each of the portions being encrypted with a different session key. As noted above, a malicious actor who might be able to decrypt one of the session keys would be unlikely to be able to decrypt the other ones of the session keys, thereby increasing security of the message.

Figure 6:
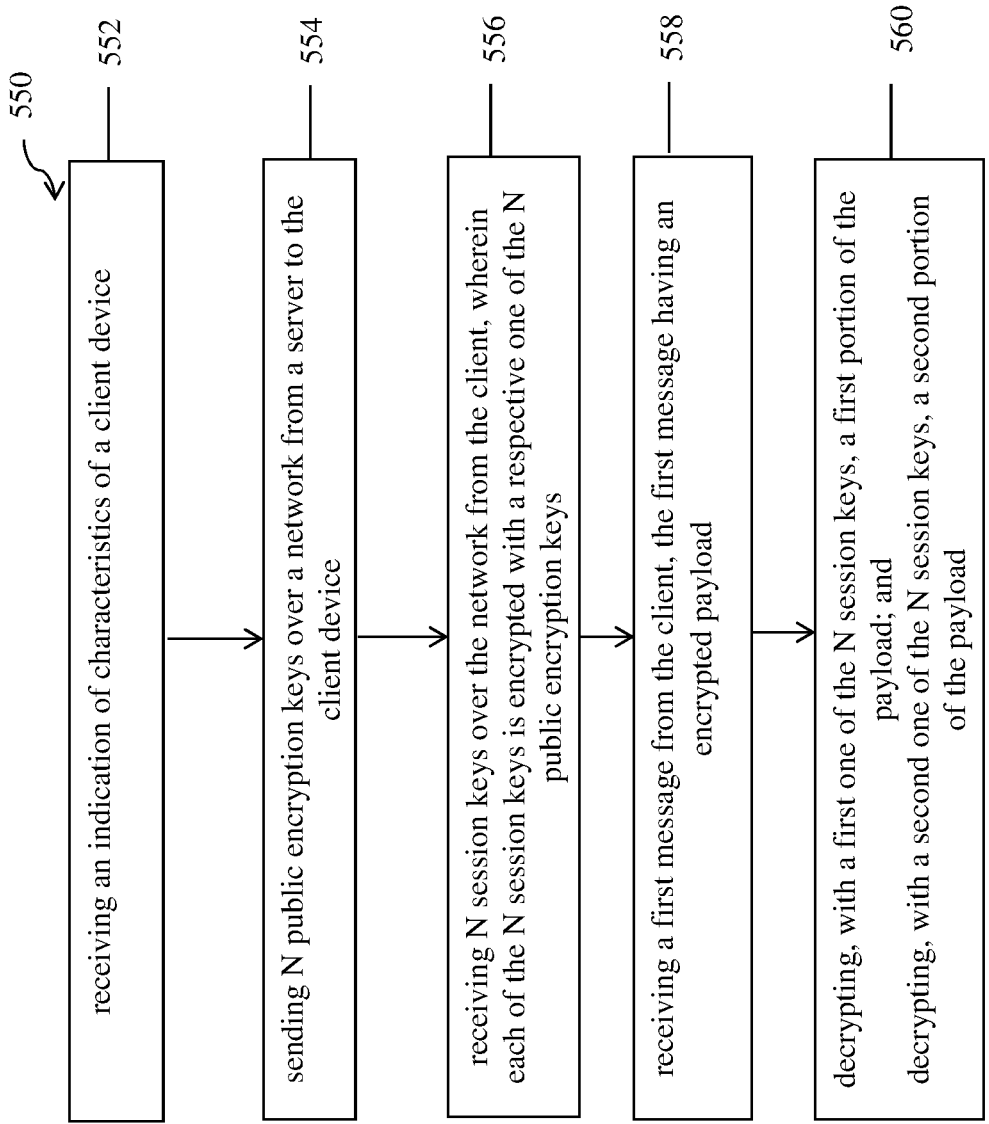

FIG. 6 is an illustration of an example method 550, adapted according to one embodiment. The actions of method 550 may be performed by a server device (e.g., server 130). The various actions are provided by the server as a result of executing computer-readable code by one or more processors, wherein the computer readable code includes instructions. For instance, encryption application 136 of FIG. 1 running on a server device may execute instructions to provide the functionality described below. Furthermore, example method 550 may accompany the actions of method 500 of FIG. 5, as a server communicates with a client.

At action 552, encryption application 136 receives an indication of characteristics of a client device. For example, the characteristics may include operating system version, supported encryption types, a supported number of session keys, or other appropriate information. An example is described above at message 210 of FIG. 2.

At action 554, encryption application 136 uses the information from action 552 to determine a numerical value for N and to then send N public encryption keys over a network to the client device. An example is described above at message 212 of FIG. 2.

At action 556, the encryption application 136 receives N session keys over the network from the client. In this example, each of the N session keys may be encrypted with a respective one of the N public encryption keys. An example is described above with respect to message 214 of FIG. 2.

At action 558, the encryption application 136 receives a message from the client, the message having an encrypted payload. An example is discussed above with respect to message 218 of FIG. 2. The payload of the message may be divided into multiple portions, each of the portions being encrypted with a respective one of the N session keys.

At action 560, the encryption application 136 decrypts and reassembles the payload to generate clear text. For instance, the encryption application 136 may decrypt a first portion of the payload using a first one of the N session keys and decrypt a second portion of the payload using a second one of the N session keys. As noted above, N may be any appropriate integer greater than 1. So in an example in which N equals 3, action 560 may also include decrypting a third portion of the payload using a third one of the N session keys. Action 560 may also include using knowledge about the particular payload division to appropriately decrypt and reassemble the payload. Action 560 may also include using a checksum to verify the integrity of the message.

The scope of embodiments is not limited to the specific series of actions described above with respect to FIGS. 5 and 6. Rather, other embodiments may add, omit, rearrange, or modify ones of the actions. For instance, FIG. 5 illustrates a client sending the message having the encrypted payload and the server receiving the message having the encrypted payload. However, other embodiments may include the server sending the message having the encrypted payload and the client receiving the message having an encrypted payload. In other words, once the session keys have been shared between the server and the client, each of the server and the client are independently capable of encrypting and sending a message as well as receiving and decrypting a message.

Figure 7:
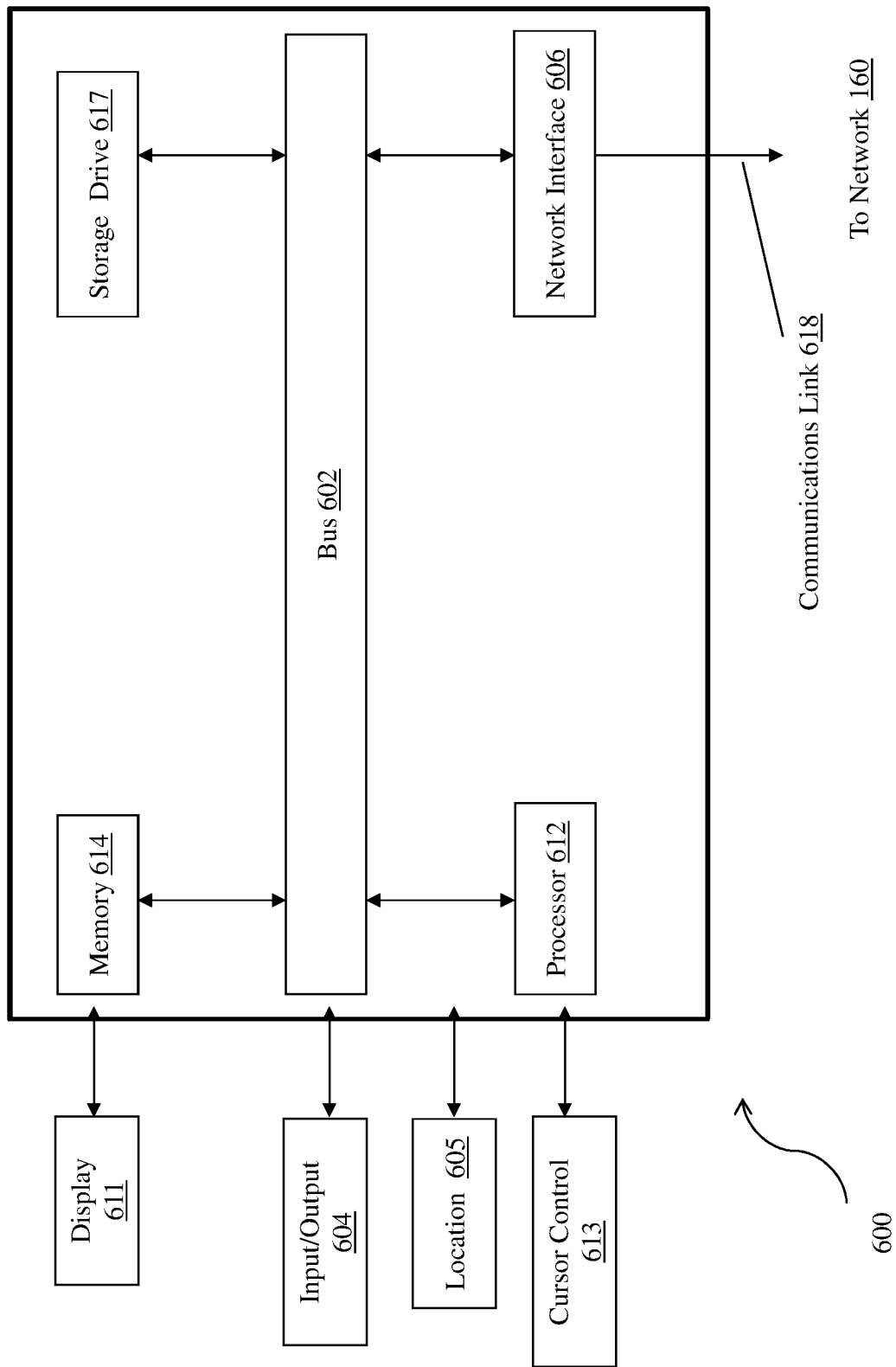
FIG. 7 is an illustration of an example computer system that may be used as a client device or a server device and to perform the actions described with respect to FIGS. 1-6, according to one embodiment.

Referring now to FIG. 7, an embodiment of a computer system 600 suitable for implementing, for example, the computing devices 110 and 130 of FIG. 1 discussed above. It should be appreciated that other devices utilized in an electronic transaction in the system discussed above may be implemented as the computer system 600 in a manner as follows.

In accordance with various embodiments of the present disclosure, computer system 600, such as a smart phone, computer, and/or a network server, includes a bus 602 or other communication mechanism for communicating information, which interconnects subsystems and components, such as a processing component 612 (e.g., processor, micro-controller, digital signal processor (DSP), etc.), a system memory component 614 (e.g., RAM) a storage drive component 617 (e.g., solid-state, hard drive, or optical), a network interface component 606 (e.g., wireless card, modem, or Ethernet card), a display component 611 (e.g., a touchscreen, CRT, or LCD), an input/output component 604 (e.g., keyboard, keypad, a touchscreen), a cursor control component 613 (e.g., mouse, pointer, or trackball), and/or a location determination component 605 (e.g., a Global Positioning System (GPS) device as illustrated, a cell tower triangulation device, and/or a variety of other location determination devices known in the art). In one implementation, the storage drive component 617 may comprise a database having one or more storage drive components.

In accordance with embodiments of the present disclosure, the computer system 600 performs specific operations by the processor 612 executing one or more sequences of instructions contained in the memory component 614, such as described herein with respect to FIGS. 1-6 discussed above. Such instructions may be read into the system memory component 614 from another computer readable medium, such as storage drive 617. In other embodiments, hard-wired circuitry may be used in place of or in combination with software instructions to implement the present disclosure.

Logic may be encoded in a computer readable medium, which may refer to any tangible a non-transitory medium that participates in providing instructions to the processor 612 for execution. Such a medium may take many forms, including but not limited to, non-volatile media and volatile media. In various implementations, non-volatile media includes hard drive or solid state drives, such as the storage drive component 617, and volatile media includes dynamic memory, such as the system memory component 614.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of the computer systems 600 coupled by a communication link 618 to the network 160 (e.g., such as a LAN, WLAN, PTSN, and/or various other wired or wireless networks, including telecommunications, mobile, and cellular phone networks) may perform instruction sequences to practice the present disclosure in coordination with one another.

The computer system 600 may transmit and receive messages, data, information and instructions, including one or more programs (i.e., application code) through the communication link 618 and the network interface component 606. The network interface component 606 may include an antenna, either separate or integrated, to enable transmission and reception via the communication link 618. Received program code may be executed by processor 612 as received and/or stored in storage drive component 617 or some other non-volatile storage component for execution.

The present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   receiving, by a client device, N public encryption keys over a network from a server, wherein N is an integer greater than 1, and wherein the N public encryption keys are associated with the server;
   generating N session keys in response to receiving the N public encryption keys;
   encrypting each of the N session keys with a respective one of the N public encryption keys;
   subsequent to encrypting each of the N session keys, sending the N session keys encrypted over the network to the server;
   encrypting, with a first one of the N session keys, a first portion of a payload associated with a first message;
   encrypting, with a second one of the N session keys, a second portion of the payload associated with the first message; and
   sending the first message, comprising the payload encrypted, to the server from the client.

2. The method of claim 1, further comprising:
   receiving instructions from the server, the instructions specifying a numerical value for N.

3. The method of claim 1, further comprising:
   receiving instructions from the server, the instructions specifying a division of the payload into N portions, including the first portion and the second portion.

4. The method of claim 1, further comprising:
   receiving instructions from the server, the instructions specifying first bytes of the payload for the first portion and second bytes of the payload for the second portion.

5. The method of claim 1, further comprising generating a hash of the payload before the payload is encrypted.

6. The method of claim 5, further comprising:
   inserting the hash into the first message.

7. The method of claim 1, wherein generating the N session keys comprises:
   generating N alphanumeric strings, wherein each of the N alphanumeric strings corresponds to a respective one of the N session keys.

8. The method of claim 1, wherein the method is performed by an application on a mobile device.

9. A non-transitory machine-readable medium having stored thereon machine-readable instructions executable to cause a machine to perform operations comprising:
   receiving N public encryption keys over a network from a server and instructions for encrypting messages using N session keys, wherein the N public encryption keys are associated with the server;
   generating the N session keys in response to the receiving the N public encryption keys;
   encrypting each of the N session keys with a respective one of the N public encryption keys;
   subsequent to the encrypting each of the N session keys, sending the N session keys encrypted over the network to the server; and
   sending a first message to the server, wherein a payload associated with the first message is encrypted according to the instructions, the payload having a first portion encrypted with a first one of the N session keys and a second portion encrypted with a second one of the N session keys.

10. The non-transitory machine-readable medium of claim 9, wherein the operations further comprise:
    before encrypting the payload, performing a hash on the payload and inserting the hash into the first message.

11. The non-transitory machine-readable medium of claim 9, wherein each of the N session keys comprises a symmetric key.

12. The non-transitory machine-readable medium of claim 9, wherein the instructions for encrypting messages comprises:
    specifying a numerical value for N.

13. The non-transitory machine-readable medium of claim 9, wherein the instructions for encrypting messages comprises:
    specifying a division of the payload into N portions.

14. The non-transitory machine-readable medium of claim 9, wherein generating the N session keys comprises:
    generating N alphanumeric strings, wherein each of the N alphanumeric strings corresponds to a respective one of the N session keys.

15. A system, comprising:
    a non-transitory memory; and
    one or more hardware processors coupled to the non-transitory memory and configured to read instructions from the non-transitory memory to cause the system to perform operations comprising:
    receiving an indication of characteristics of a client device;
    in response to the indication of characteristics of the client device, sending N public encryption keys over a network from a server to the client device, wherein N is an integer greater than 1, and wherein the N public encryption keys are associated with the server;
    receiving N session keys over the network from the client device, wherein each of the N session keys is encrypted with a respective one of the N public encryption keys;
    receiving a first message from the client device, the first message comprising a payload that is encrypted;
    decrypting, with a first one of the N session keys, a first portion of the payload; and
    decrypting, with a second one of the N session keys, a second portion of the payload.

16. The system of claim 15, wherein receiving the indication of characteristics of the client device is performed during a handshaking operation between the server and the client device.

17. The system of claim 15, wherein the operations further comprise:
in response to the indication of characteristics of the client device, determining an encryption type for the first message and determining a numerical value for N.

18. The system of claim 17, wherein the operations further comprise:
sending instructions to the client device for encrypting the payload, the instructions including the encryption type for the first message and the numerical value for N.

19. The system of claim 15, wherein the operations further comprise:
after decrypting the first portion of the payload and the second portion of the payload, reassembling the payload; and
confirming integrity of the payload by performing a hash on the payload and comparing the hash to a checksum.

20. The system of claim 15, wherein sending N public encryption keys comprises:
sending N certificates to the client device.

* * * * *